(12) United States Patent
Lee et al.

(10) Patent No.: US 8,890,861 B2
(45) Date of Patent: Nov. 18, 2014

(54) ELECTROPHORETIC DISPLAY APARATUS AND METHOD OF DRIVING THE SAME

(75) Inventors: SonUk Lee, Seongnam-si (KR); Seonggyu Kwon, Suwon-si (KR); Namseok Roh, Seongnam-si (KR); Tae Hyung Hwang, Seoul (KR); Joo-Han Bae, Seongnam-si (KR); Sang-Hee Jang, Bucheon-si (KR)

(73) Assignee: Samsung Display Co., Ltd. (KR)

( * ) Notice: Subject to any disclaimer, the term of this patent is extended or adjusted under 35 U.S.C. 154(b) by 589 days.

(21) Appl. No.: 13/227,726

(22) Filed: Sep. 8, 2011

(65) Prior Publication Data
US 2012/0280958 A1    Nov. 8, 2012

(30) Foreign Application Priority Data

May 2, 2011  (KR) .................. 10-2011-0041684

(51) Int. Cl.
*G06F 3/038* (2013.01)
*G02F 1/167* (2006.01)
*G09G 3/34* (2006.01)

(52) U.S. Cl.
CPC ........ *G09G 3/344* (2013.01); *G09G 2300/0452* (2013.01); *G02F 1/167* (2013.01); *G02F 2001/1676* (2013.01); *G09G 2300/08* (2013.01); *G09G 2310/061* (2013.01)
USPC ............................ 345/214; 345/107; 345/211

(58) Field of Classification Search
USPC ............................ 345/211, 107, 214; 359/295
See application file for complete search history.

(56) References Cited

U.S. PATENT DOCUMENTS

| | | | |
|---|---|---|---|
| 2004/0239613 A1* | 12/2004 | Kishi | 345/107 |
| 2006/0038772 A1 | 2/2006 | Amundson et al. | |
| 2007/0263277 A1 | 11/2007 | Liang et al. | |
| 2009/0109172 A1* | 4/2009 | Lee et al. | 345/107 |

FOREIGN PATENT DOCUMENTS

| | | |
|---|---|---|
| JP | 2007-147829 A | 6/2007 |
| JP | 2007-310265 A | 11/2007 |
| KR | 10-2008-0096870 A | 11/2008 |
| KR | 10-2009-0073887 A | 7/2009 |
| KR | 1020120068436 A | 6/2012 |

* cited by examiner

*Primary Examiner* — Robin Mishler
(74) *Attorney, Agent, or Firm* — Cantor Colburn LLP

(57) ABSTRACT

In an electrophoretic display apparatus, a first substrate includes a plurality of pixels each including at least two sub-pixels which display colors different from each other, and a second substrate which faces the first substrate and includes a reference electrode corresponding to a boundary between adjacent sub-pixels in each pixel. An electrophoretic material is between the first substrate and the second substrate. A barrier wall is between the first substrate and the second substrate, and defines the pixels.

15 Claims, 11 Drawing Sheets

<I-Frame>

<R-Frame>

<I-Frame>

<R-Frame>

ELECTROPHORETIC DISPLAY APARATUS AND METHOD OF DRIVING THE SAME

This application claims priority to Korean Patent Application No. 10-2011-0041684 filed on May 2, 2011, and all the benefits accruing therefrom under 35 U.S.C. §119, the contents of which are herein incorporated by reference in its entirety.

BACKGROUND OF THE INVENTION

1. Field of the Invention

The invention relates to an electrophoretic display apparatus and a method of driving the same. More particularly, the invention relates to an electrophoretic display apparatus capable of improving reflectance and color reproducibility thereof, and a method of driving the electrophoretic display apparatus.

2. Description of the Related Art

In general, a liquid crystal display displays an image using optical properties of liquid crystals and has advantages of slimness, light weight, and low power consumption as compared with a cathode ray tube. However, the liquid crystal display is limited in reducing the thickness and weight since the liquid crystal display requires a backlight assembly to provide light to the liquid crystals.

In contrast, an electrophoretic display apparatus displays the image using an electrophoretic phenomenon in which electrified pigment particles are moved by an electric field formed between upper and lower substrates. The electrophoretic display apparatus does not need to have a separate light source since the electrophoretic display apparatus is a reflective display apparatus that absorbs or reflects the light provided from an exterior by the pigment particles to display the image. Accordingly, the electrophoretic display apparatus has advantages of slimness and light weight as compared with the liquid crystal display.

BRIEF SUMMARY OF THE INVENTION

Exemplary embodiments of the invention provide an electrophoretic display apparatus capable of improving reflectance and color reproducibility thereof.

Exemplary embodiments of the invention provide a method of driving the electrophoretic display apparatus.

According to the exemplary embodiments, an electrophoretic display apparatus includes a first substrate including a plurality of pixels, each including at least two sub-pixels which display colors different from each other, a second substrate which faces the first substrate and includes a reference electrode which corresponds to a boundary between adjacent sub-pixels in each pixel, an electrophoretic material between the first substrate and the second substrate, and a barrier wall between the first substrate and the second substrate. The barrier wall defines pixel areas including the pixels.

According to the exemplary embodiments, an electrophoretic display apparatus is driven by applying a reset voltage to sub-pixels of a pixel of the electrophoretic display during a reset frame, and by applying an image data voltage to the sub-pixels of the pixel during an image frame. The electrophoretic display apparatus includes a first substrate including a plurality of pixels, each including at least two sub-pixels which display colors different from each other, a second substrate which faces the first substrate and includes a reference electrode which corresponds to a boundary between adjacent sub-pixels in each pixel, an electrophoretic material between the first substrate and the second substrate, and a barrier wall between the first substrate and the second substrate, where the barrier wall defines pixel areas including the pixels.

According to the above, each pixel includes the sub-pixels, and the reference electrode is between the sub-pixels to hold the electrophoretic particles such that the electrophoretic particles do not overlap the sub-pixels. Since the barrier wall does not exist between adjacent sub-pixels, the electrophoretic particles may freely move between the sub-pixels.

Thus, a reflectance of the sub-pixel which displays an image having a white gray scale may be improved, thereby improving a color reproducibility of the electrophoretic display apparatus.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION OF THE INVENTION

Figure 1:
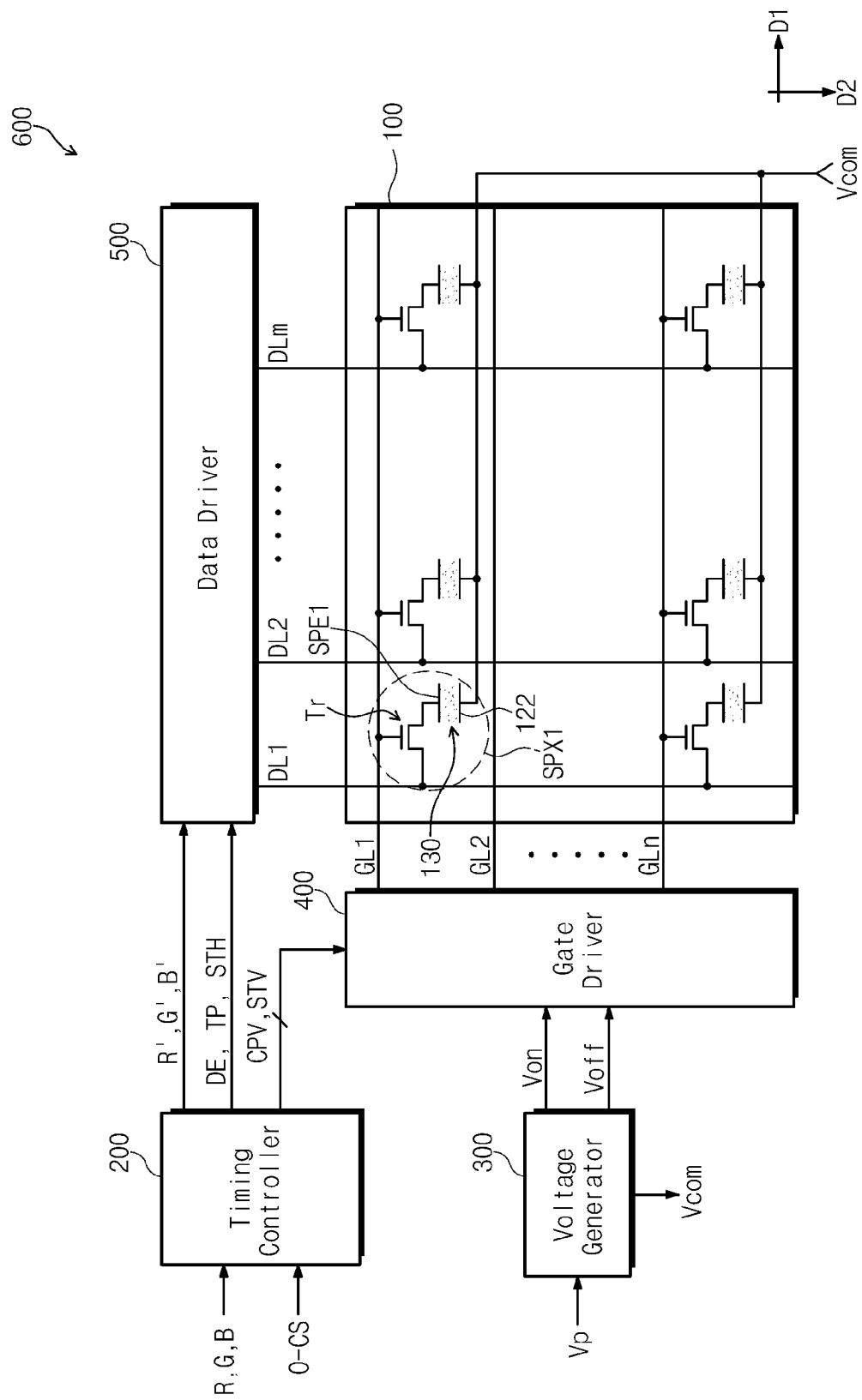
FIG. 1 is a block diagram showing an exemplary embodiment of an electrophoretic display apparatus according to the invention.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

FIG. 1 is a block diagram showing an exemplary embodiment of an electrophoretic display apparatus according to the invention.

Referring to FIG. 1, an electrophoretic display apparatus 600 includes a display panel 100, a timing controller 200, a voltage generator 300, a gate driver 400, and a data driver 500.

The display panel 100 includes a plurality of data lines DL1 to DLm, a plurality of gate lines GL1 to GLn, and a plurality of pixels PX.

The gate lines GL1 to GLn are extended in a first direction D1, and arranged in a second direction D2 substantially perpendicular to the first direction D1. The data lines DL1 to DLm are extended in the second direction D2, and arranged in the first direction D1. The data lines DL1 to DLm are insulated from the gate lines GL1 to GLn and cross the gate lines GL1 to GLn.

Each pixel PX includes first, second, third, and fourth sub-pixels SPX1, SPX2, SPX3, and SPX4. The pixels PX in FIG. 1 each include four sub-pixels as an example, but the number of the sub-pixels should not be limited to four sub-pixels.

The first to fourth sub-pixels SPX1, SPX2, SPX3, and SPX4 have the same structure and function, and thus the first sub-pixel SPX1 among the first to fourth sub-pixels SPX1, SPX2, SPX3, and SPX4 will be described in detail as a representative example.

The first sub-pixel SPX1 includes a thin film transistor Tr and a first sub-pixel electrode SPE1. The thin film transistor Tr includes a gate electrode connected to the first gate line GL1 of the gate lines GL1 to GLn, a source electrode connected to the first data line DL1 of the data lines DL1 to DLm, and a drain electrode connected to the first sub-pixel electrode SPE1.

The thin film transistor Tr is turned on in response to a gate-on voltage Von applied through the first gate line GL1, and the turned-on thin film transistor Tr receives a data voltage through the first data line DL1 and applies the data voltage to the first sub-pixel electrode SPE1.

The first sub-pixel electrode SPE1 receives the data voltage to form an electric field between a reference electrode 122 and the first sub-pixel electrode SPE1. The reference electrode 122 receives a reference voltage Vcom, and the data voltage may have a positive (+) polarity or a negative (−) polarity with respect to the reference voltage Vcom.

The display panel 100 further includes an electrophoretic material in which electrophoretic particles moving according to the electric field formed between the first sub-pixel electrode SPE1 and the reference electrode 122 are dispersed.

The electrophoretic particles may be electrified with either negative (−) or positive (+) polarity and have black or white color. The electrophoretic particles move according to the intensity and direction of the electric field formed between the first sub-pixel electrode SPE1 and the reference electrode 122. The movement of the electrophoretic particles will be described in detail with reference to FIGS. 2 to 9.

The timing controller 200 receives a plurality of image signals RGB and a plurality of control signals O-CS from an exterior of the electrophoretic display apparatus 600. The timing controller 200 converts a data format of the image signals RGB into a data format appropriate to an interface between the timing controller 200 and the data driver 500, and provides the converted image signals R'G'B' to the data driver 500. In addition, the timing controller 200 applies data control signals, such as a data enable signal DE, an output start signal TP, a horizontal start signal STH, etc., to the data driver 500 and applies gate control signals, such as a vertical start signal STV, a gate clock signal CPV, etc., to the gate driver 400.

The voltage generator 300 receives a power source voltage Vp to apply a gate-on voltage Von and a gate-off voltage Voff to the gate driver 400. In addition, the voltage generator 300 generates the reference voltage Vcom and applies the reference voltage Vcom to the reference electrode 122. The reference voltage Vcom may have a voltage level equal to a ground voltage.

The gate driver 400 starts its operation in response to the vertical start signal STV and sequentially outputs a gate signal to the gate lines GL1 to GLn in response to the clock signal CPV. The gate signal is output as the gate-on voltage Von during a horizontal scanning period 1H and as the gate-off voltage Voff during a remaining time period.

The data driver 500 converts the image signals R'G'B' into data voltages in response to the data enable signal DE, the output start signal TP, and the horizontal start signal STH, and outputs the data voltages to the data lines DL1 to DLm at a predetermined time point. The data voltages applied to the data lines DL1 to DLm are applied to the first sub-pixel electrodes SPE1 of the first sub-pixels SPX1 of the pixels PX through the thin film transistors Tr turned on in response to the gate-on voltage Von.

Accordingly, the electric field is formed between the first sub-pixel electrode SPE1 and the reference electrode 122, and thus the electrophoretic particles move according to the direction of the electric field. According to the degree of the movement of the electrophoretic particles, the gray scale value represented by the first sub-pixel SPX1 may be varied. In addition, the gray scale value represented by the first sub-pixel SPX1 may be determined depending on the level and the application time point of the data voltage.

Figure 2:
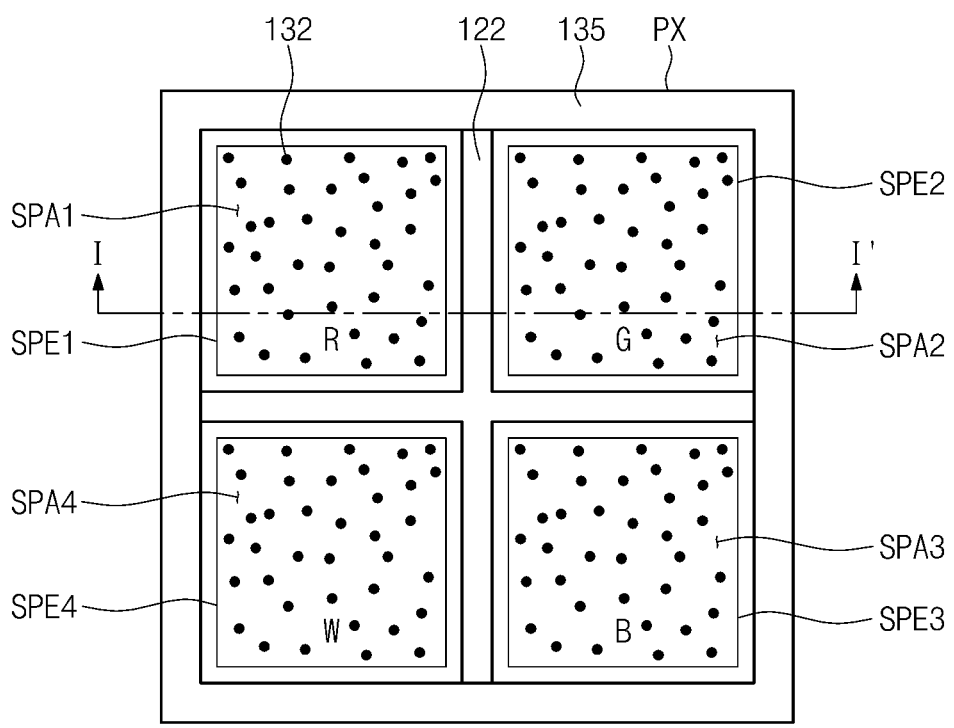
FIG. 2 is a plan view showing an exemplary embodiment of a pixel in the display panel of the electrophoretic display apparatus shown in FIG. 1.
Figure 3:
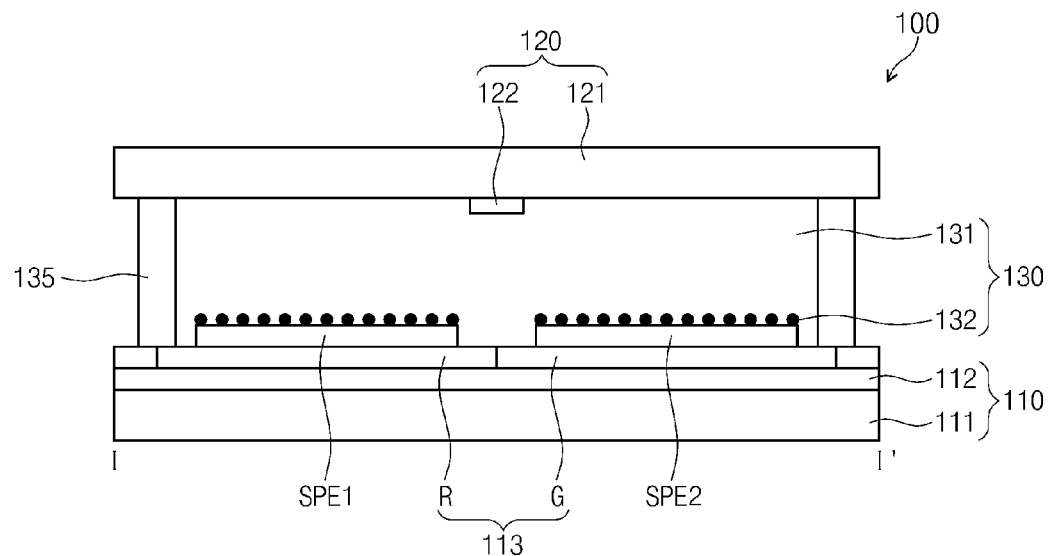
FIG. 3 is a cross-sectional view taken along line I-I' shown in FIG. 2.

FIG. 2 is a plan view showing an exemplary embodiment of a pixel in the display panel of the electrophoretic display apparatus shown in FIG. 1, and FIG. 3 is a cross-sectional view taken along line I-I' shown in FIG. 2.

Referring to FIGS. 2 and 3, the display panel 100 includes a first substrate 110, a second substrate 120 facing the first substrate 110, and an electrophoretic material 130 interposed between the first substrate 110 and the second substrate 120.

The first substrate 110 includes the pixels PX. Each pixel PX includes at least two sub-pixels that display different colors from each other. As in the illustrated embodiment, each pixel PX may include the first to fourth pixels SPX1 to SPX4.

The first to fourth pixels SPX1 to SPX4 may be arranged in an array of two rows and two columns. In addition, the first to fourth pixels SPX1 to SPX4 may display red, green, blue, and white colors, respectively, as shown in FIG. 2. However, according to another exemplary embodiment of the invention, each pixel may include three sub-pixels to display red, green, and blue colors. In addition, the first to fourth sub-pixels SPX1 to SPX4 may be arranged in an array of one row and four columns, or four rows and one column, alternative to the two rows and two columns.

The display panel 100 further includes a barrier wall 135 which defines the pixel area of the pixel PX. The pixel area may be divided into first, second, third, and fourth sub-pixel areas SPA1, SPA2, SPA3, and SPA4 in which the first, second, third, and fourth sub-pixels SPX1, SPX2, SPX3, and SPX4 are disposed, respectively.

The first substrate 110 further includes a first base substrate 111, a reflection layer 112, and a color layer 113. The reflection layer 112 reflects a light incident from an exterior of the electrophoretic display apparatus 600 through the second substrate 120. In addition, the reflection layer 112 includes one or more stacked layers and essentially acts as a mirror to reflect the light. Further, the reflection layer 112 may include a material having high reflectance, such as aluminum (Al).

The color layer 113 is disposed on the reflection layer 112 and converts the light reflected by the reflection layer 112 into a light having a predetermined color. In the illustrated exemplary embodiment, the color layer 113 may include red, green, blue, and white color pixels R, G, B, and W, as indicated in FIG. 2.

The red, green, blue, and white color pixels R, G, B, and W may be disposed in the first to fourth sub-pixel areas SPA1, SPA2, SPA3, and SPA4, respectively. The first to fourth sub-pixel electrodes SPE1, SPE2, SPE3, and SPE4 may be disposed on the red, green, blue, and white color pixels R, G, B, and W, respectively. The first to fourth sub-pixel electrodes SPE1 to SPE4 are spaced apart from each other by a predetermined distance to be electrically insulated from each other.

The second substrate 120 includes a second base substrate 121 and the reference electrode 122. The reference electrode 122 is disposed on the second base substrate 121. Particularly, the reference electrode 122 is positioned corresponding to a boundary respectively between the first to fourth sub-pixels SPX1 to SPX4 in the pixel PX.

As shown in FIG. 2, when the first to fourth sub-pixels SPX1 to SPX4 are arranged in the array of two rows and two columns, the reference electrode 122 is disposed to correspond to a space between two adjacent sub-pixels. Thus, as in the illustrated embodiment, the reference electrode 122 may have a cross shape in a plan view of the pixel PX. In addition, as shown in FIG. 3, the reference electrode 122 has a width taken in a direction parallel to the first base substrate 111 smaller than a distance between the two adjacent sub-pixels in the same direction in a cross-sectional view.

The barrier wall 135 is disposed between the first substrate 110 and the second substrate 120 to define the pixel area. In addition, the barrier wall 135 separates the electrophoretic material 130 to remain in defined pixel areas. Accordingly, the barrier wall 135 blocks the electrophoretic material 130 in each pixel area from moving to an adjacent pixel area, thereby preventing the electrophoretic material 130 from concentrating at one pixel area.

The electrophoretic material 130 is provided between the first and second substrates 110 and 120 and includes a dielectric solvent 131, and the electrophoretic particles 132 dispersed in the dielectric solvent 131. The electrophoretic particles 132 may be particles of a white, black, red, green, or blue color. The electrophoretic particles 132 move according to the direction of the electric field formed between the first and second substrates 110 and 120.

In an exemplary embodiment, for example, the electrophoretic particles 132 may have the black color, and thus the electrophoretic particles 132 may include a carbon black.

The electrophoretic particles 132 may be electrified with the positive (+) or negative (−) polarity. In the case that the electrophoretic particles 132 have the negative polarity, the electrophoretic particles 132 move to the first to fourth sub-pixel electrodes SPE1 to SPE4 when the reference electrode 122 is applied with the reference voltage of about zero volts and the first to fourth sub-pixel electrodes SPE1 to SPE4 are applied with the data voltage of about +15 volts. Accordingly, the light incident through the second substrate 120 is absorbed by the electrophoretic particles 132 without being provided to the reflection layer 112. Hereinafter, this is referred to as "black gray scale display mode."

In addition, in the case that the electrophoretic particles 132 have the negative polarity, the electrophoretic particles 132 move to the reference electrode 122 when the reference electrode 122 is applied with the reference voltage of about zero volts and the first to fourth sub-pixel electrodes SPE1 to SPE4 are applied with the data voltage of about −15 volts. Accordingly, the light incident through the second substrate 120 is reflected by the reflection layer 112 to travel to the exterior of the electrophoretic display apparatus 600. Hereinafter, this is referred to as "white gray scale display mode."

When the electrophoretic particles 132 have the positive (+) polarity, the electrophoretic particles 132 move to the contrary direction.

The driving method of the display panel 100 will be described in detail with reference to FIGS. 8 and 9.

Figure 4:
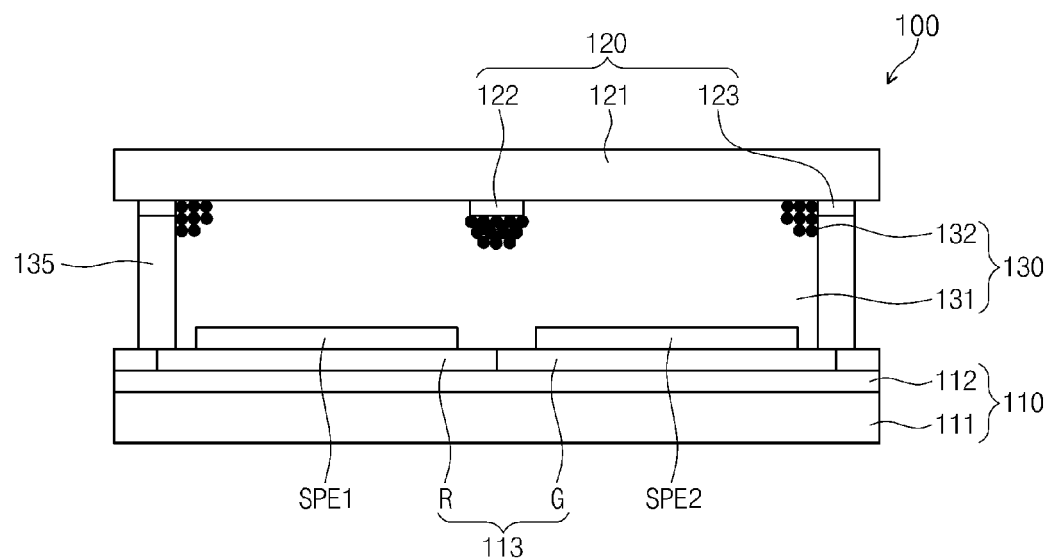
FIG. 4 is a cross-sectional view showing another exemplary embodiment of a pixel in the display panel of the electrophoretic display apparatus shown in FIG. 1 according to the invention.
Figure 5:
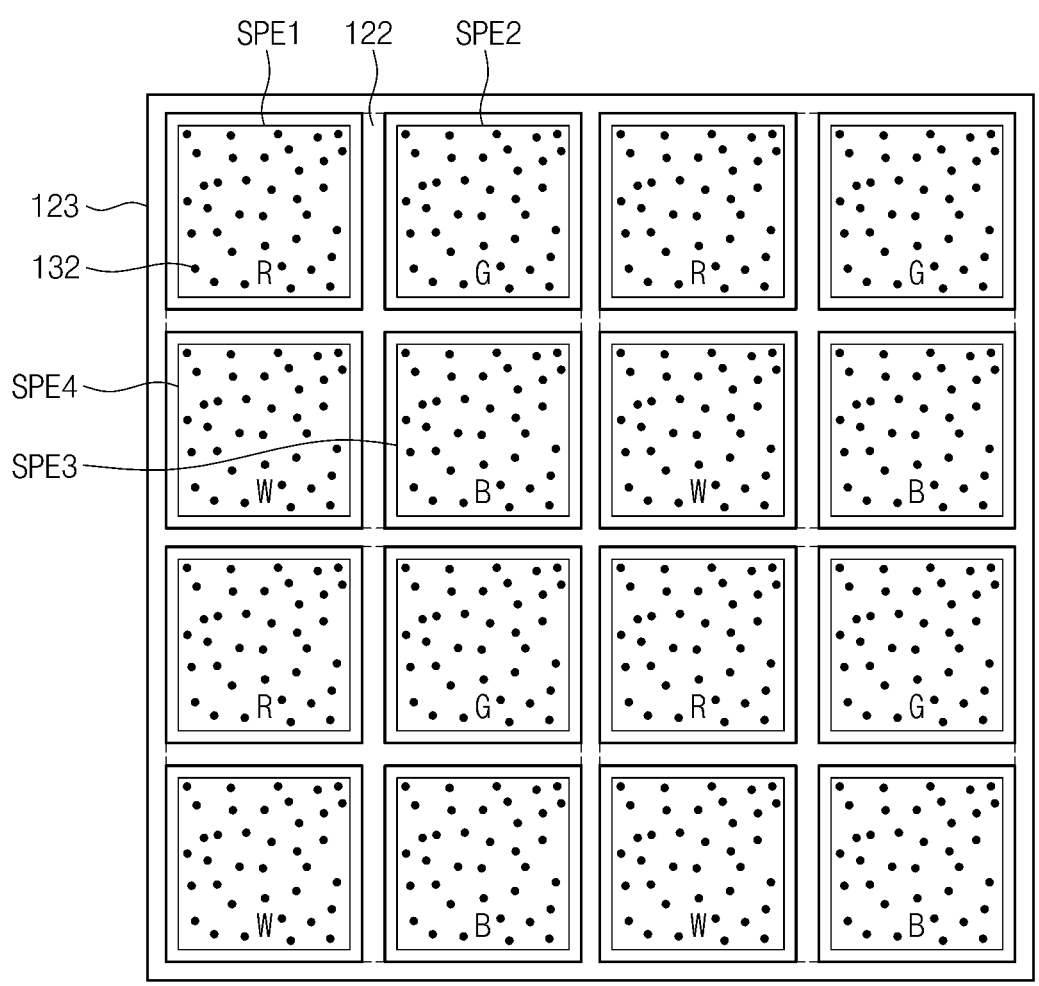
FIG. 5 is a plan view showing a state of black gray scale on the display panel shown in FIG. 4.

FIG. 4 is a cross-sectional view showing another exemplary embodiment of a pixel of the display panel of the electrophoretic display apparatus according to the invention and FIG. 5 is a plan view showing a state of black gray scale on the display panel shown in FIG. 4. In FIG. 4, the same reference numerals denote the same elements in FIG. 3, and thus detailed descriptions of the same elements will be omitted. In addition, FIG. 5 shows four pixels PX arranged in an array of two rows and two columns.

Referring to FIG. 4, the second substrate 120 further includes a dummy reference electrode 123 facing an upper surface of the barrier wall 135. The dummy reference electrode 123 may be disposed between the barrier wall 135 and the second base substrate 121.

Similar to the reference electrode 122, the dummy reference electrode 123 receives the reference voltage Vcom to form an electric field between the first to fourth sub-pixel electrodes SPE1 to SPE4. Accordingly, the electrophoretic particles 132 may separately move to the reference electrode 122 and the dummy reference electrode 123 according to the direction of the electric field.

As shown in FIG. 5, the dummy reference electrode 123 may be integrally formed with the reference electrode 122. That is, the dummy reference electrode 123 and the reference electrode 122 may collectively be a single, unitary, indivisible electrode. In an exemplary embodiment of a method of forming the electrophoretic display apparatus 600, the reference electrode 122 and the dummy reference electrode 123 may be substantially simultaneously formed by forming a transparent conductive layer (not shown) on the second base substrate 121 and patterning the transparent conductive layer. In an exemplary embodiment, for example, the transparent conductive layer may include indium tin oxide ("ITO") or indium zinc oxide ("IZO").

Figure 6:
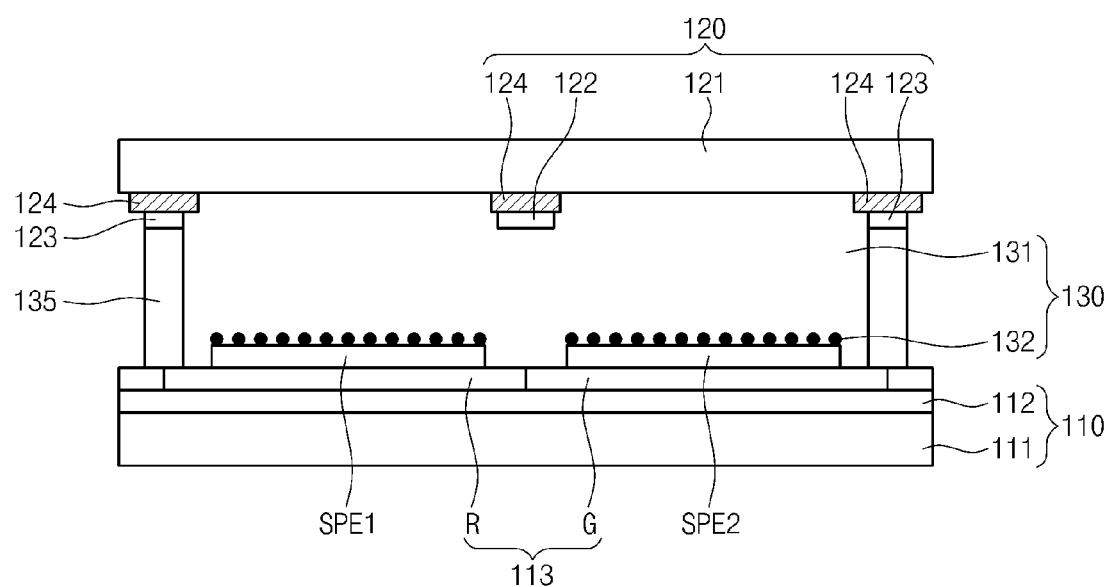
FIG. 6 is a cross-sectional view showing another exemplary embodiment of a pixel in the display panel of the electrophoretic display apparatus shown in FIG. 1 according to the invention.
Figure 7:
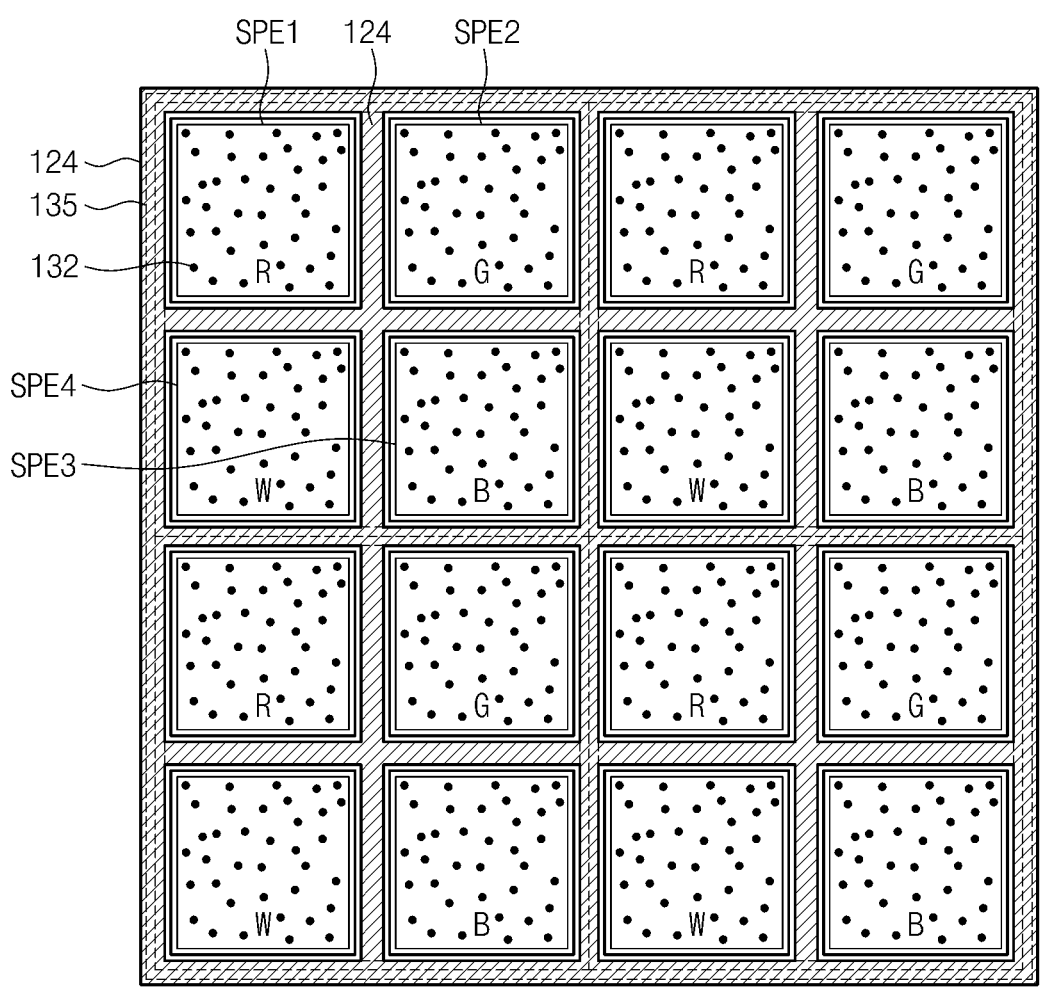
FIG. 7 is a plan view showing a state of black gray scale on the display panel shown in FIG. 6.

FIG. 6 is a cross-sectional view showing another exemplary embodiment of a pixel in the display panel of the electrophoretic display apparatus according to the invention and FIG. 7 is a plan view showing a state of black gray scale on the display panel shown in FIG. 6. In FIG. 6, the same reference numerals denote the same elements in FIG. 4, and thus detailed descriptions of the same elements will be omitted. In addition, FIG. 7 shows four pixels PX arranged in the array of two rows and two columns.

Referring to FIGS. 6 and 7, the second substrate 120 further includes a light blocking layer 124 which overlaps the barrier wall 135, the dummy reference electrode 123 and the reference electrode 122. In an exemplary embodiment, for example, the light blocking layer 124 may include a metal material such as chromium (Cr) or an organic black matrix.

In addition, when the second substrate 120 further includes the dummy reference electrode 123, the light blocking layer 124 may be disposed between the dummy reference electrode 123 and the second base substrate 121.

As shown in FIGS. 6 and 7, the light blocking layer 124 is disposed in a non-display area excluding the first to fourth sub-pixel electrodes SPE1 to SPE4. Accordingly, the contrast ratio of the image displayed on the display panel 100 may be enhanced by the light blocking layer 124.

FIGS. 8a through 8d are cross-sectional views showing an exemplary embodiment of a method of driving an electrophoretic display apparatus according to the invention and FIGS. 9a through 9d are plan views showing the driving method of the electrophoretic display apparatus shown in FIG. 8.

Figure 8A:
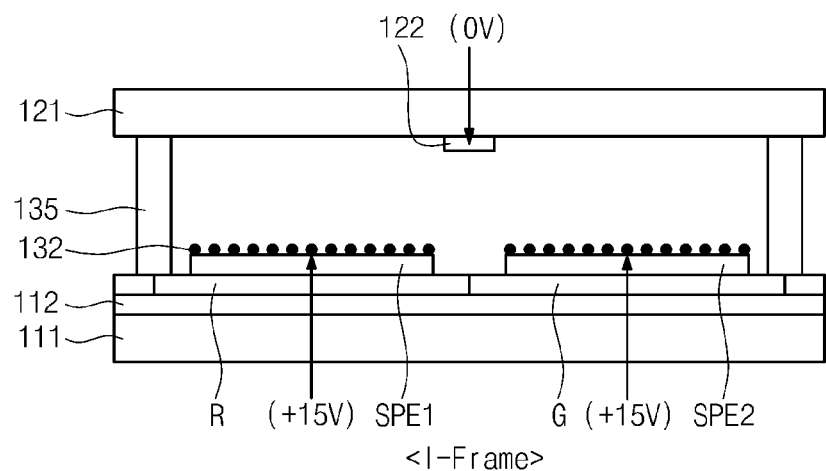
FIGS. 8a through 8d are cross-sectional views showing an exemplary embodiment of a method of driving an electrophoretic display apparatus according to the invention.
Figure 9A:
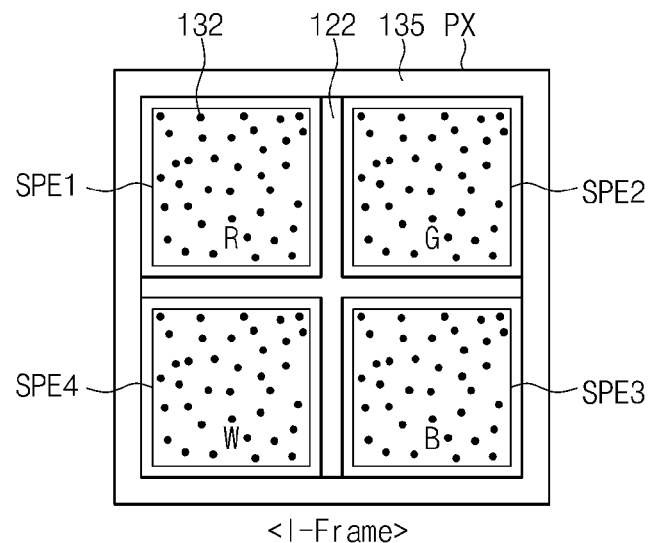
FIGS. 9a through 9d are plan views showing the driving method of the electrophoretic display apparatus shown in FIG. 8.

Referring to FIGS. 8a and 9a, a black data voltage (e.g., +15 volts) is applied to the first to fourth sub-pixel electrodes SPE1 to SPE4 during an image frame I-Frame to display an image having a black gray scale.

When the electrophoretic particles 132 are electrified in the negative (−) polarity and the black data voltage has the positive (+) polarity with respect to the reference electrode 122, the electrophoretic particles 132 entirely cover the first to fourth sub-pixel electrodes SPE1 to SPE4, so that the image having the black gray scale may be displayed.

Figure 8B:
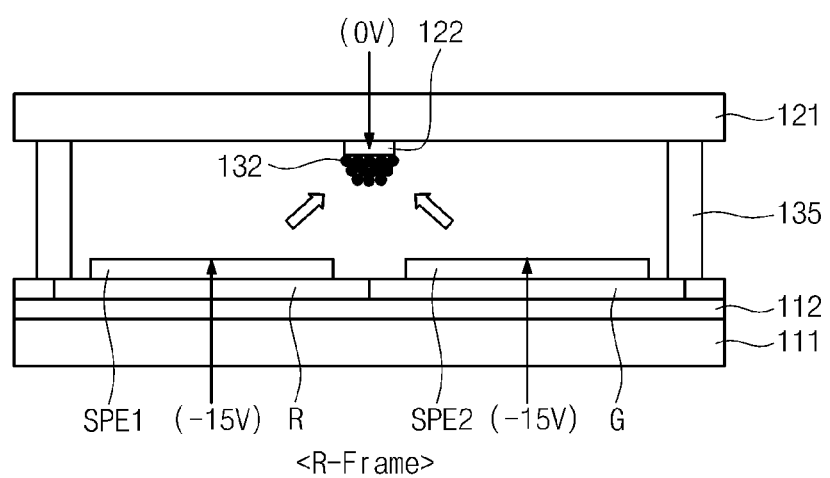
Figure 9B:
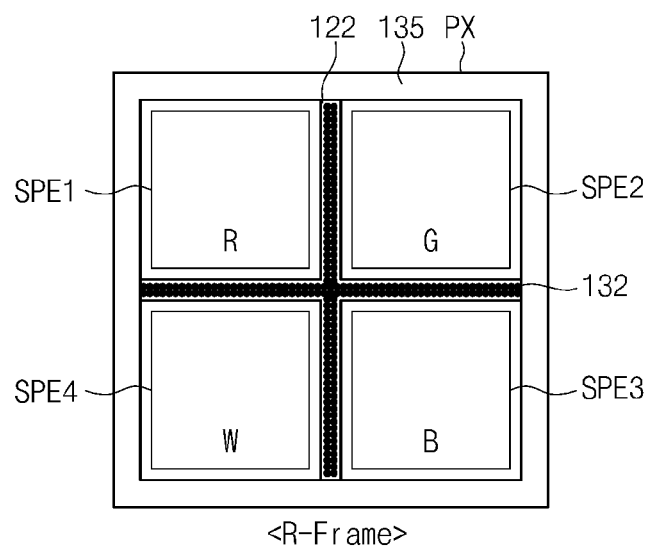

According to the illustrated exemplary embodiment, referring to FIGS. 8b and 9b, a reset frame R-Frame is provided between two consecutive image frames. The first to fourth sub-pixel electrodes SPE1 to SPE4 are applied with a reset voltage during the reset frame R-Frame.

When the electrophoretic particles 132 are electrified in the negative (−) polarity and the reset voltage has the negative (−) polarity with respect to the reference electrode 122, the electrophoretic particles 132 move to the reference electrode 122 from the first to fourth sub-pixel electrodes SPE1 to SPE4 as represented by the two arrows. That is, the electrophoretic particles 132 do not overlap any of the first to fourth sub-pixel electrodes SPE1 to SPE4. Thus, the image having the white black gray scale may be displayed during the reset frame R-Frame. As in the illustrated embodiment, the reset voltage may be a white data voltage (e.g., −15 volts) having an opposite polarity to the black data voltage.

Figure 8C:
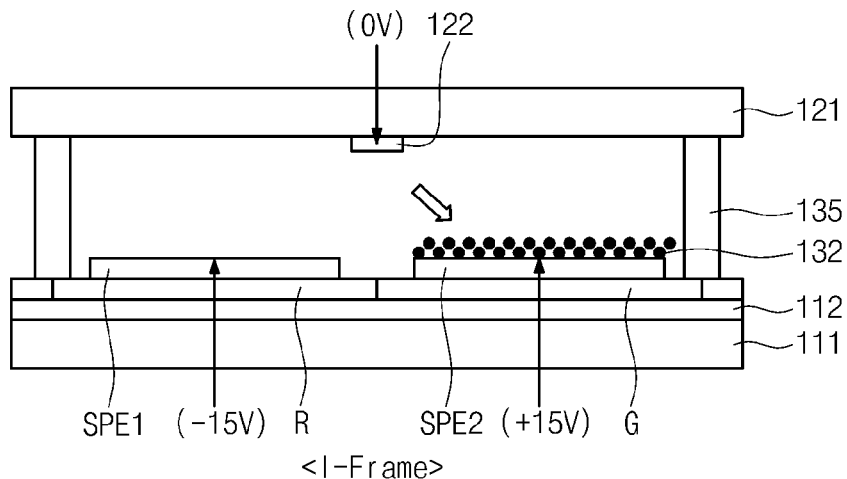
Figure 9C:
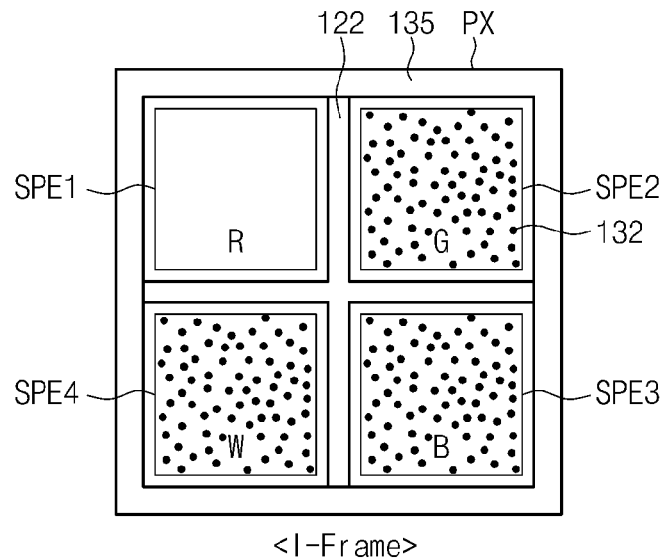

Then, referring to FIGS. 8c and 9c, where a red color image is displayed during a next image frame I-Frame, the first sub-pixel electrode SPE1 disposed on the red color pixel R is applied with the white data voltage of about −15 volts and the second to fourth sub-pixel electrodes SPE2, SPE3, and SPE4 respectively disposed on the red, green, and white color pixels R, G, and W are applied with the black data voltage of about +15 volts. Thus, the electrophoretic particles 132 held on the reference electrode 122 move to the second to fourth sub-pixel areas SPA2 to SPA4 from the reference electrode 122 as represented by the one arrow. That is, the electrophoretic particles 132 do not overlap the first sub-pixel electrode SPE1.

Figure 8D:
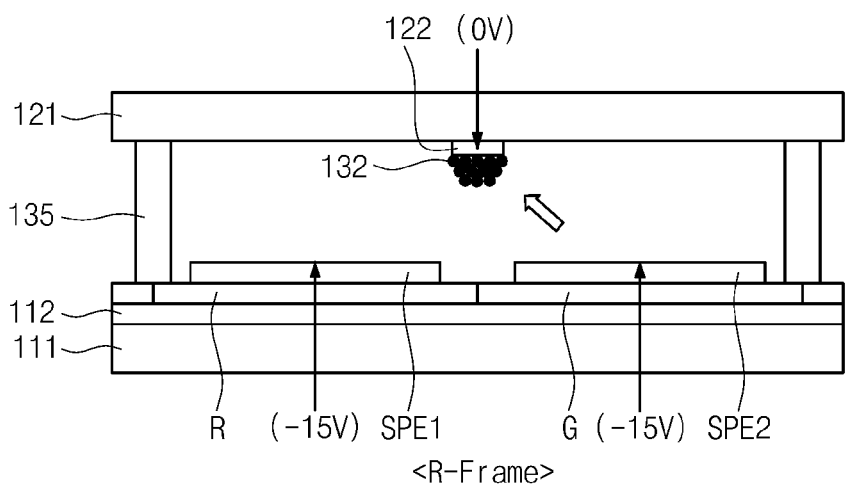
Figure 9D:
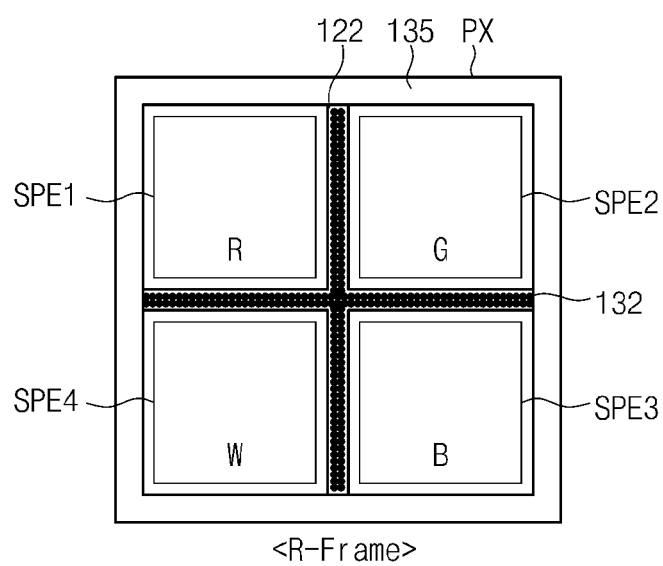

Referring to FIGS. 8d and 9d, a reset frame R-Frame is again provided where the first to fourth sub-pixel electrodes SPE1 to SPE4 are applied with a reset voltage during the reset frame R-Frame. When the electrophoretic particles 132 are electrified in the negative (−) polarity and the reset voltage has the negative (−) polarity with respect to the reference electrode 122, the electrophoretic particles 132 move to the reference electrode 122 from the second to fourth sub-pixel areas SPA2 to SPA4 as represented by the one arrow to be held on the reference electrode 122. That is, the electrophoretic particles 132 do not overlap any of the first to fourth sub-pixel electrodes SPE1 to SPE4.

As shown in FIGS. 8a through 8d and 9a through 9d, since the barrier wall 135 does not exist between the first to fourth sub-pixel areas SPA1 to SPA4, the electrophoretic particles 132 may move freely between the first to fourth sub-pixel areas SPA1 to SPA4 of the pixel PX.

Figure 10:
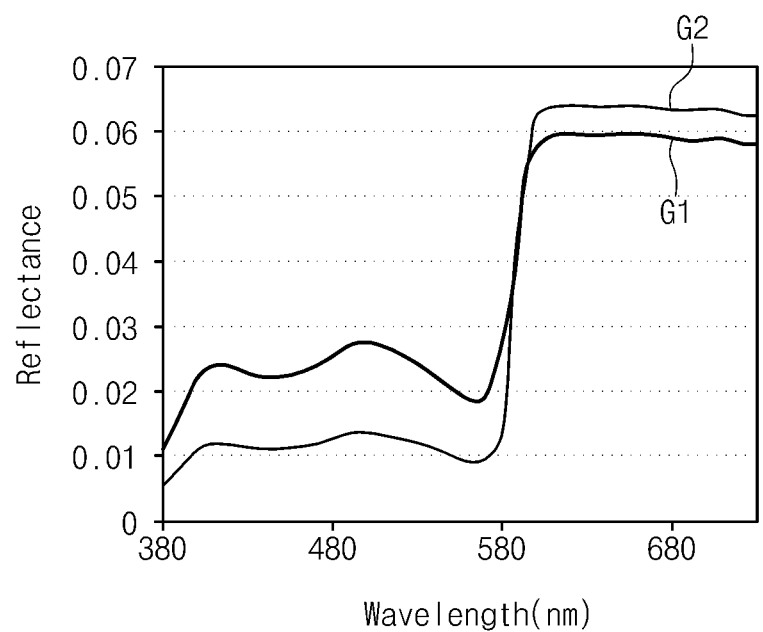
FIG. 10 is a graph showing reflectance according to wavelength.

FIG. 10 is a graph showing reflectance according to wavelength. In FIG. 10, an x-axis represents a wavelength in nanometers (nm) and a y-axis represents reflectance. In addition, in FIG. 10, a first graph G1 represents the reflectance measured from the structure in which the barrier wall exists within the pixel to divide and separate the first to fourth sub-pixel areas SPA1 to SPA4 from each other, and a second graph G2 represents the reflectance measured from the structure in which the barrier wall does not exist within the pixel and does not divide and separate the first to fourth sub-pixel areas SPA1 to SPA4 from each other.

Referring to FIG. 10, in the case that the barrier wall dividing the first to fourth sub-pixel areas SPA1 to SPA4 does not exist within the pixel, the electrophoretic particles 132 existing in the sub-pixel area used to display the image having the white gray scale among the first to fourth sub-pixel areas SPA1 to SPA4 may move to the sub-pixel area used to display the image having the black gray scale. In addition, when the barrier wall does not exist within the pixel to divide and separate the first to fourth sub-pixel areas SPA1 to SPA4 from each other, the electrophoretic particles 132 may not exist in the sub-pixel area in which the image having the white gray scale is displayed.

However, in the case that the barrier wall exists within the pixel and separates the first to fourth sub-pixel areas SPA1 to SPA4 from each other, the electrophoretic particles 132 may not move to the adjacent sub-pixel area. In addition, when the barrier wall exists within the pixel, the electrophoretic particles 132 may remain at a boundary of the sub-pixel area in which the image having the white gray scale is displayed.

Accordingly, when the barrier wall is removed from within the pixel, decrease of an aperture ratio and a reflectance of the sub-pixel area used to display the image having the white gray scale may be reduced or effectively prevented.

In addition, when the barrier wall is removed from the pixel and does not divide and separate the sub-pixel areas from each other, since the electrophoretic particles 132 may move to the sub-pixel area in which the image having the black gray scale is displayed from the sub-pixel area in which the image having the white gray scale is displayed, the number of the electrophoretic particles 132 may be increased in the sub-pixel area in which the image having the black gray scale is displayed. As a result, the electrophoretic particles 132 may be stacked on each other in a plurality of layers, thereby improving display characteristics of the image having the black gray scale. According to the first and second graphs G1 and G2, when the barrier wall is removed from within the pixel and does not divide and separate the sub-pixel areas from each other, the black and white properties are improved. Thus, the contrast ratio and the color reproducibility may be improved.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. An electrophoretic display apparatus comprising:
    a first substrate including a plurality of pixels, each including at least two sub-pixels which display colors different from each other;
    a second substrate which faces the first substrate, the second substrate including a reference electrode which corresponds to a boundary between adjacent sub-pixels in each pixel;
    an electrophoretic material between the first substrate and the second substrate; and
    a barrier wall between the first substrate and the second substrate,
    wherein the barrier wall defines pixel areas including the pixels, and
    wherein the barrier wall is not between the adjacent sub-pixels.

2. The electrophoretic display apparatus of claim 1, wherein the reference electrode corresponds to a space between two adjacent sub-pixels in each pixel.

3. The electrophoretic display apparatus of claim 2, wherein within each of the sub-pixels:
    the first substrate further includes:
        a reflection layer which reflects a first light incident through the second substrate;
        a color layer on the reflection layer, wherein the color layer converts the first light into a second light having a predetermined color; and
        a sub-pixel electrode on the color layer, wherein the sub-pixel electrode forms an electric field in cooperation with the reference electrode of the second substrate, and the electric field moves the electrophoretic material.

4. The electrophoretic display apparatus of claim 3, wherein
    each of the pixels comprises four sub-pixels, and
    the four sub-pixels comprise a red, green, blue, and white color layer, respectively.

5. The electrophoretic display apparatus of claim 4, wherein the electrophoretic material comprises:
    a dielectric solvent, and
    electrophoretic particles in the dielectric solvent, wherein the electrophoretic particles have a black color.

6. The electrophoretic display apparatus of claim 4, wherein the four sub-pixels are arranged in an array of two rows by two columns in each pixel.

7. The electrophoretic display apparatus of claim 6, wherein the reference electrode overlaps a boundary between the four sub-pixels, and has a cross shape in each pixel, in a plan view.

8. The electrophoretic display apparatus of claim 1, wherein the second substrate further includes a dummy reference electrode which faces an upper surface of the barrier wall.

9. The electrophoretic display apparatus of claim 8, wherein the second substrate further includes a light blocking layer which overlaps an area including the barrier wall and the reference electrode.

10. A method of driving an electrophoretic display apparatus, the method comprising:
    applying a reset voltage to sub-pixels of a pixel of the electrophoretic display apparatus during a reset frame; and
    applying an image data voltage to the sub-pixels of the pixel during an image frame;
    wherein the electrophoretic display apparatus comprises:
        a first substrate including a plurality of pixels, each including at least two sub-pixels which display colors different from each other,
        a second substrate which faces the first substrate and includes a reference electrode which corresponds to a boundary between adjacent sub-pixels in each pixel,
        an electrophoretic material between the first substrate and the second substrate, and
        a barrier wall between the first substrate and the second substrate,
        wherein the barrier wall defines pixel areas including the pixels, and
        wherein the barrier wall is not between the adjacent sub-pixels.

11. The method of claim 10, wherein
    the reference electrode is applied with a reference voltage, the electrophoretic material comprises electrophoretic particles electrified with a first polarity, and the sub-pixels are applied with the reset voltage having a second polarity opposite to the first polarity with respect to the reference voltage, during the reset frame.

12. The method of claim 11, wherein the electrophoretic particles have a black color and are held on the reference electrode, during the reset frame.

13. The method of claim 12, wherein each of the pixels comprises four sub-pixels which respectively display red, green, blue, and white colors, respectively, and the four sub-pixels display an image having a white gray scale, during the reset frame.

14. The method of claim 13, wherein the electrophoretic particles move to a sub-pixel which displays an image having a black gray scale among the four sub-pixels, during the image frame.

15. The method of claim 12, wherein
- the second substrate further includes a dummy reference electrode which faces an upper surface of the barrier wall and receives the reference voltage, and
- the dummy reference electrode holds the electrophoretic particles during the reset frame.

* * * * *